United States Patent
Cole et al.

(10) Patent No.: US 10,876,897 B2
(45) Date of Patent: Dec. 29, 2020

(54) CONFIGURABLE FAIL-SAFE FLAME DETECTOR

(71) Applicant: Honeywell International Inc., Morris Plains, NJ (US)

(72) Inventors: Barrett E. Cole, Bloomington, MN (US); Christopher Scott Larsen, Plymouth, MN (US); Kwong Wing Au, Bloomington, MN (US)

(73) Assignee: Honeywell International Inc., Charlotte, NC (US)

( * ) Notice: Subject to any disclaimer, the term of this patent is extended or adjusted under 35 U.S.C. 154(b) by 576 days.

(21) Appl. No.: 15/225,165

(22) Filed: Aug. 1, 2016

(65) Prior Publication Data

US 2018/0031426 A1 Feb. 1, 2018

(51) Int. Cl.
| | |
|---|---|
| *G01J 5/00* | (2006.01) |
| *G01J 5/34* | (2006.01) |
| *G01J 5/08* | (2006.01) |
| *G01J 5/02* | (2006.01) |
| *G01J 5/20* | (2006.01) |

(52) U.S. Cl.
CPC .......... *G01J 5/0018* (2013.01); *G01J 5/0014* (2013.01); *G01J 5/026* (2013.01); *G01J 5/0831* (2013.01); *G01J 5/34* (2013.01); *G01J 5/0806* (2013.01); *G01J 5/0828* (2013.01); *G01J 5/20* (2013.01); *G01J 2005/345* (2013.01)

(58) Field of Classification Search
None
See application file for complete search history.

(56) References Cited

U.S. PATENT DOCUMENTS

| | | | | |
|---|---|---|---|---|
| 4,189,652 | A | * 2/1980 | Levinos | G02F 1/39 331/107 R |
| 5,677,532 | A | 10/1997 | Duncan et al. | |
| 6,518,574 | B1 | * 2/2003 | Castleman | G08B 17/12 250/339.05 |
| 8,326,142 | B2 | 12/2012 | Kravitz et al. | |
| 8,836,793 | B1 | 9/2014 | Kriesel et al. | |

(Continued)

FOREIGN PATENT DOCUMENTS

| | | |
|---|---|---|
| CN | 104036611 A | 9/2014 |
| GB | 2492636 A | 1/2013 |

(Continued)

OTHER PUBLICATIONS

Au, Kwong Wing, et al., "Applications of multi-spectral imaging: Failsafe industrial flame detector", *Proc. SPIE, vol. 9836: Micro- and Nanotechnolooy Sensors, Systems, and Applications VIII*, (2016), 7 pgs.

(Continued)

*Primary Examiner* — Edwin C Gunberg (57) ABSTRACT

A flame detector includes a beam splitter to split mid-wave infrared radiation (MWIR) and long-wave infrared radiation (LWIR) into an MWIR component and an LWIR component. An MWIR detector detects the MWIR component and an LWIR detector detects the LWIR component. The flame detector analyzes the MWIR component to determine the presence of a flame and analyzes the LAIR component to determine whether the system is functioning properly.

17 Claims, 6 Drawing Sheets

(56) References Cited

U.S. PATENT DOCUMENTS

2004/0119020 A1\* 6/2004 Bodkin .................... G01J 3/02
 250/353
2011/0200319 A1\* 8/2011 Kravitz ................. G03B 17/02
 396/333

FOREIGN PATENT DOCUMENTS

JP          2014-093002 A       5/2014
WO    WO-2008/022474 A1    2/2008

OTHER PUBLICATIONS

"European Application Serial No. 17183963.2, Extended European Search Report dated Dec. 12, 2017", 11 pgs.
"European Application Serial No. 17183963.2, Response filed Dec. 10, 2018 to Communication Pursuant to Article 94(3) EPC dated Jul. 30, 2018", 12 pgs.
"European Application Serial No. 17183963.2, Communication Pursuant to Article 94(3) EPC dated Jul. 30, 2018", 6 pgs.

\* cited by examiner

CONFIGURABLE FAIL-SAFE FLAME DETECTOR

TECHNICAL FIELD

The present disclosure relates to a flame detector, and in an embodiment, a fail-safe flame detector, and in a further embodiment, a configurable fail-safe flame detector.

BACKGROUND

Fire detection systems are commonly used in industry, especially industries such as refineries or chemical processing facilities. Such fire detection systems often include flame detection devices that can sense the presence of the infrared radiation that is emitted by a flame. However, a shortcoming of these prior systems includes the fact that such systems do not use readily available commercially available components, but rather specially designed and manufactured components, thereby making such systems somewhat expensive and inflexible. Other shortcomings of such systems include the occurrence of false alarms and that such systems do not operate in a fail-safe mode.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present disclosure. The following description of example embodiments is, therefore, not to be taken in a limited sense, and the scope of the present disclosure is defined by the appended claims.

The present disclosure relates to a flame detection system that observes and detects flames, and that further is able to determine if the system is functioning properly. An embodiment can achieve these functions by using one camera that can operate in two bands and receive flame signals (mid-wave infrared radiation—MWIR) to detect a flame, and also receive background signals (long-wave infrared radiation—LWIR) to ascertain if the system is functioning properly. The system determines if it is functioning properly by determining if the optics transmission is adequate (that is, one or more lenses or optical components are not fouled), if the camera is functioning properly, if there are obstructions in the field of view of the camera, and/or if hot objects are present that might be interpreted as flames. The fire detection system therefore operates in a failsafe mode, that is, the system informs the user if it is not operating properly. In the embodiment of a single camera flame detection system, a single element detector or a two-dimensional bolometer could be used. The two-dimensional bolometer array however offers advantages over a single element detector. Such a single dual band camera has the advantage of being incorporated in one camera. While a single camera is a simple approach, it might not meet the needs of every situation. Therefore, a more modular approach is desired as described herein.

Another embodiment uses two different cameras with different properties—an MWIR camera for flame detection and a separate LWIR camera for fail-safe operation. The use of separate MWIR and LWIR cameras makes the system more flexible in that the system is configurable to meet the needs of each distinct application. There are a number of configurations for a two camera fail-safe flame detector system. In one embodiment, a system includes an bolometer array for flame detection and either an LWIR camera or a visible near infrared (NIR) camera for fail-safe performance. While the LWIR camera provides twenty-four hour operation, it is more expensive compared to a CMOS (complementary metal-oxide-semiconductor) visible camera that, while significantly less expensive, only provides operation during daylight hours or in illuminated areas. In such a two camera system, lenses and beam splitters are selected to pass the wavelengths of interest. An advantage of a two camera system is that it can be configured in many different ways using standard arrays depending on the application and the needs of the situation.

Figure 1:
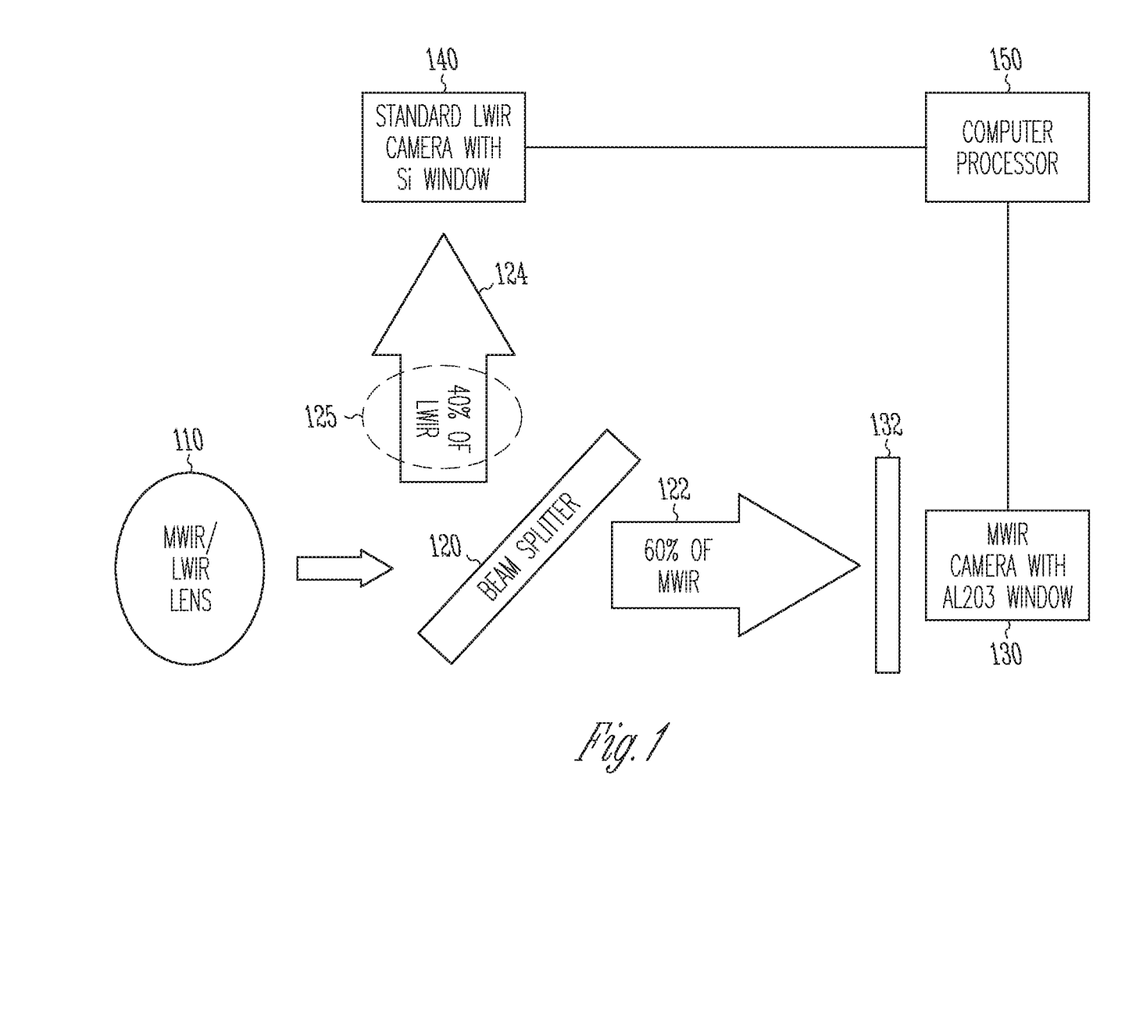
FIG. 1 illustrates an embodiment of a system and apparatus for detecting the presence of a flame and for determining that such system and apparatus are functioning properly.
Figure 2:
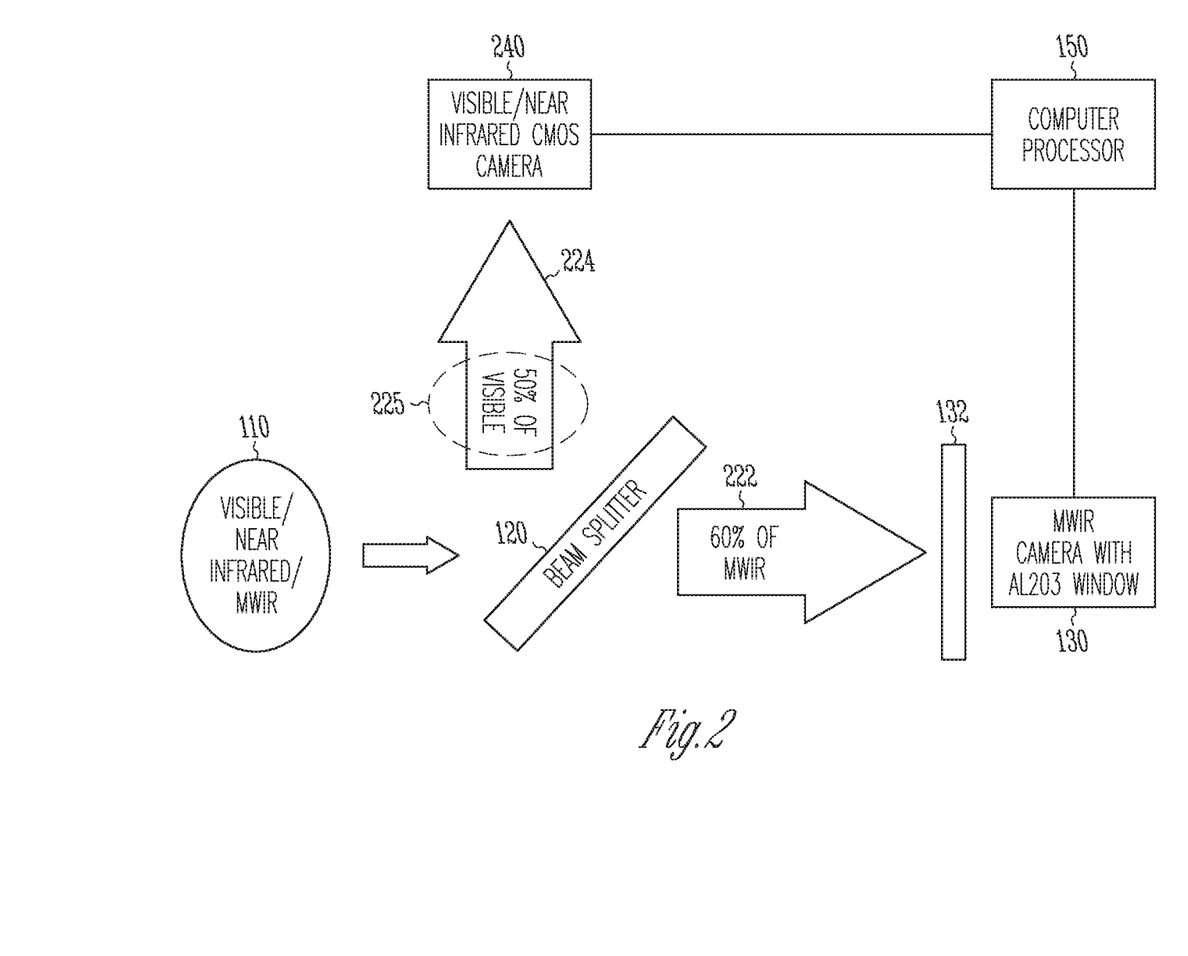
FIG. 2 illustrates another embodiment of a system and apparatus for detecting the presence of a flame and for determining that such system and apparatus are functioning properly.
Figure 3A:
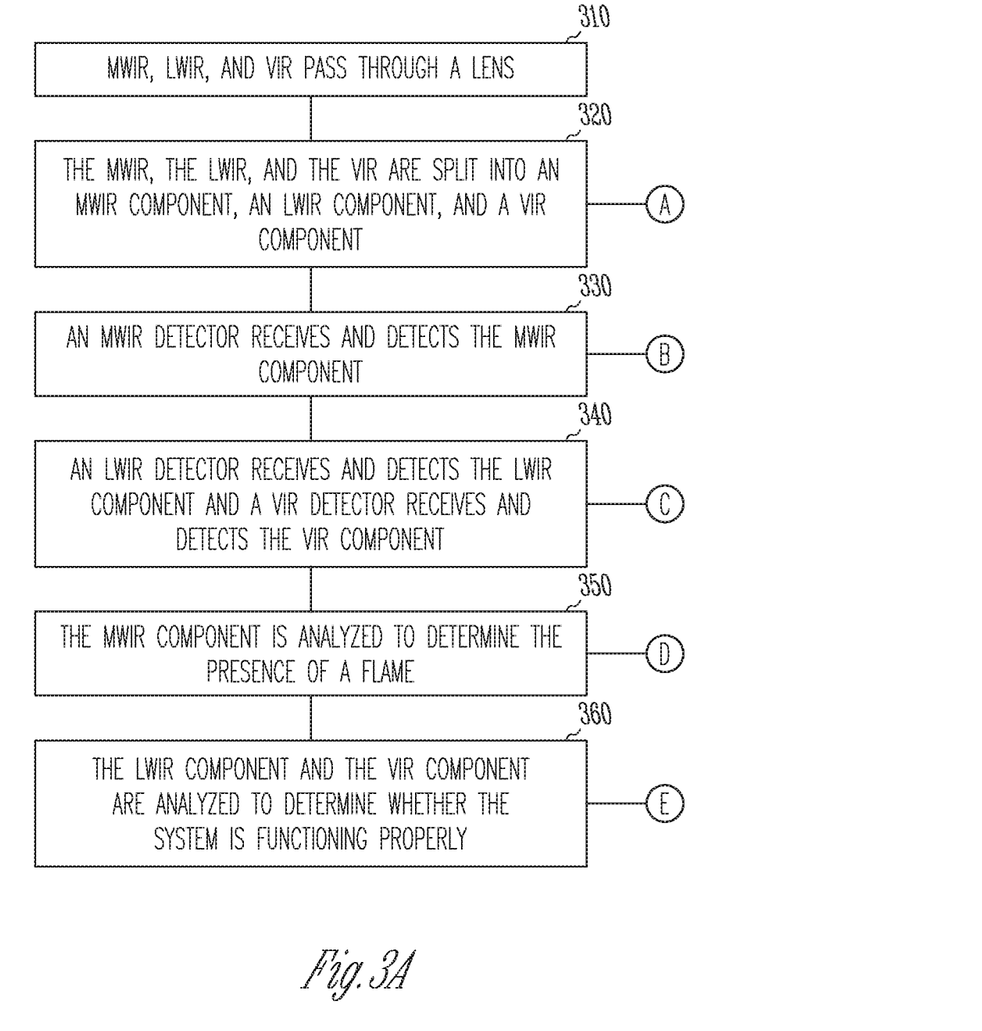
FIGS. 3A, 3B, 3C, and 3D are a block diagram illustrating features and operations of a system and apparatus for detecting the presence of a flame and for determining that such system and apparatus are functioning properly.
Figure 3B:
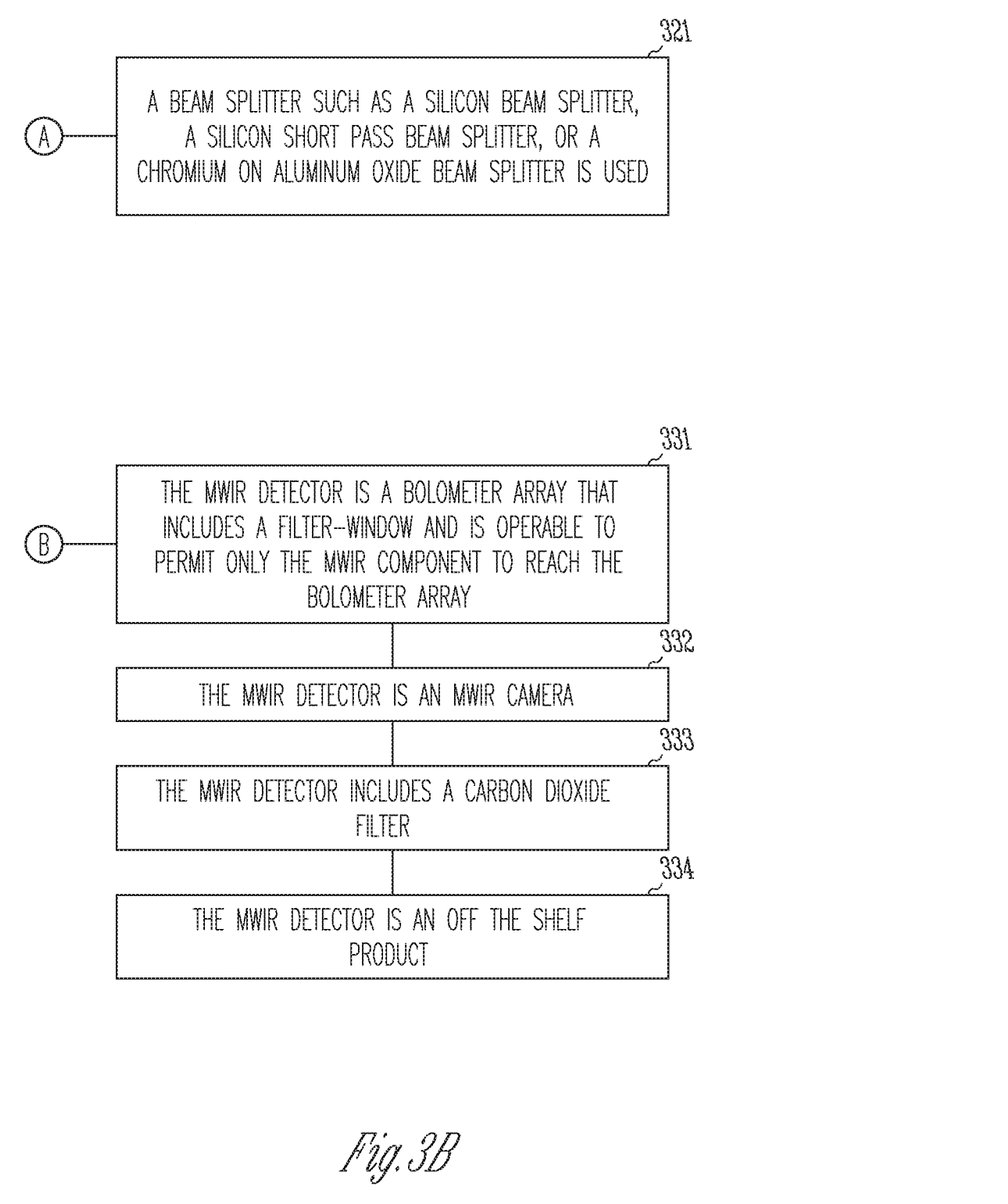
Figure 3C:
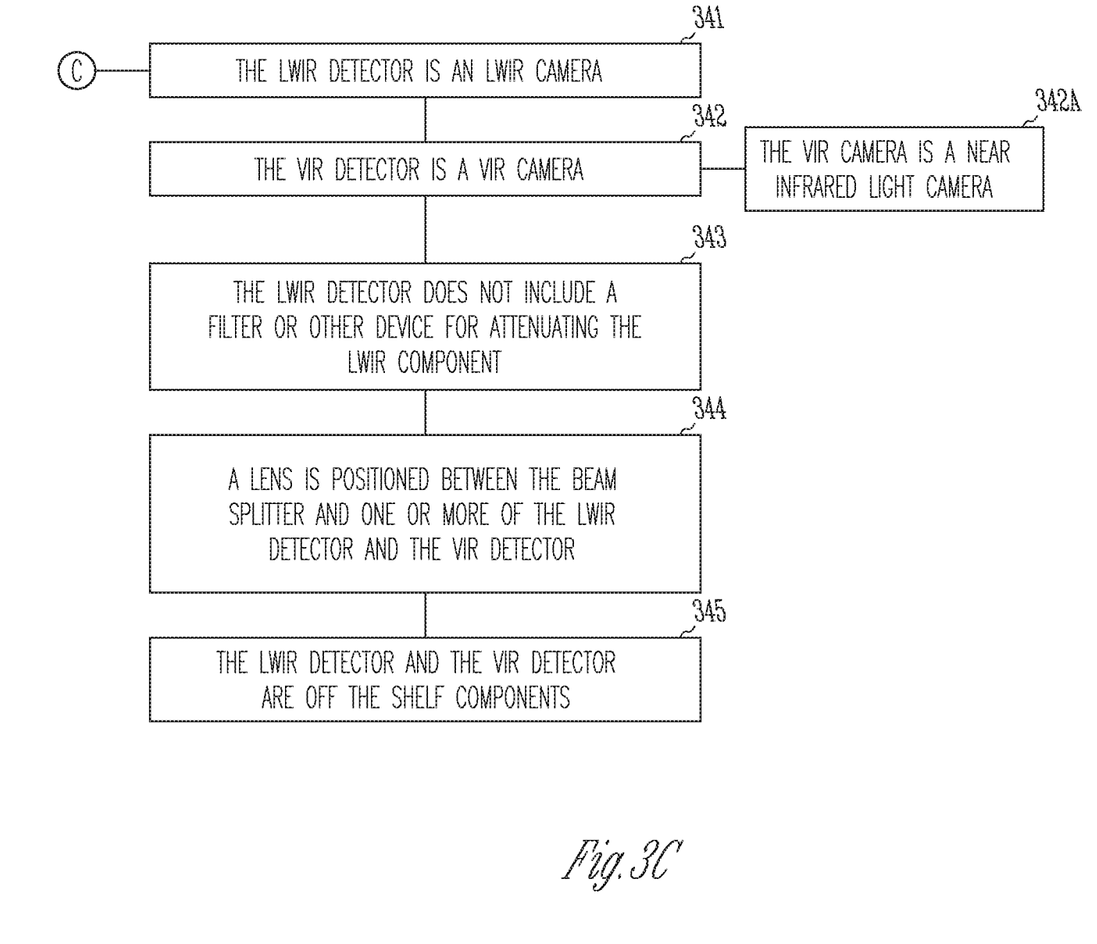
Figure 3D:
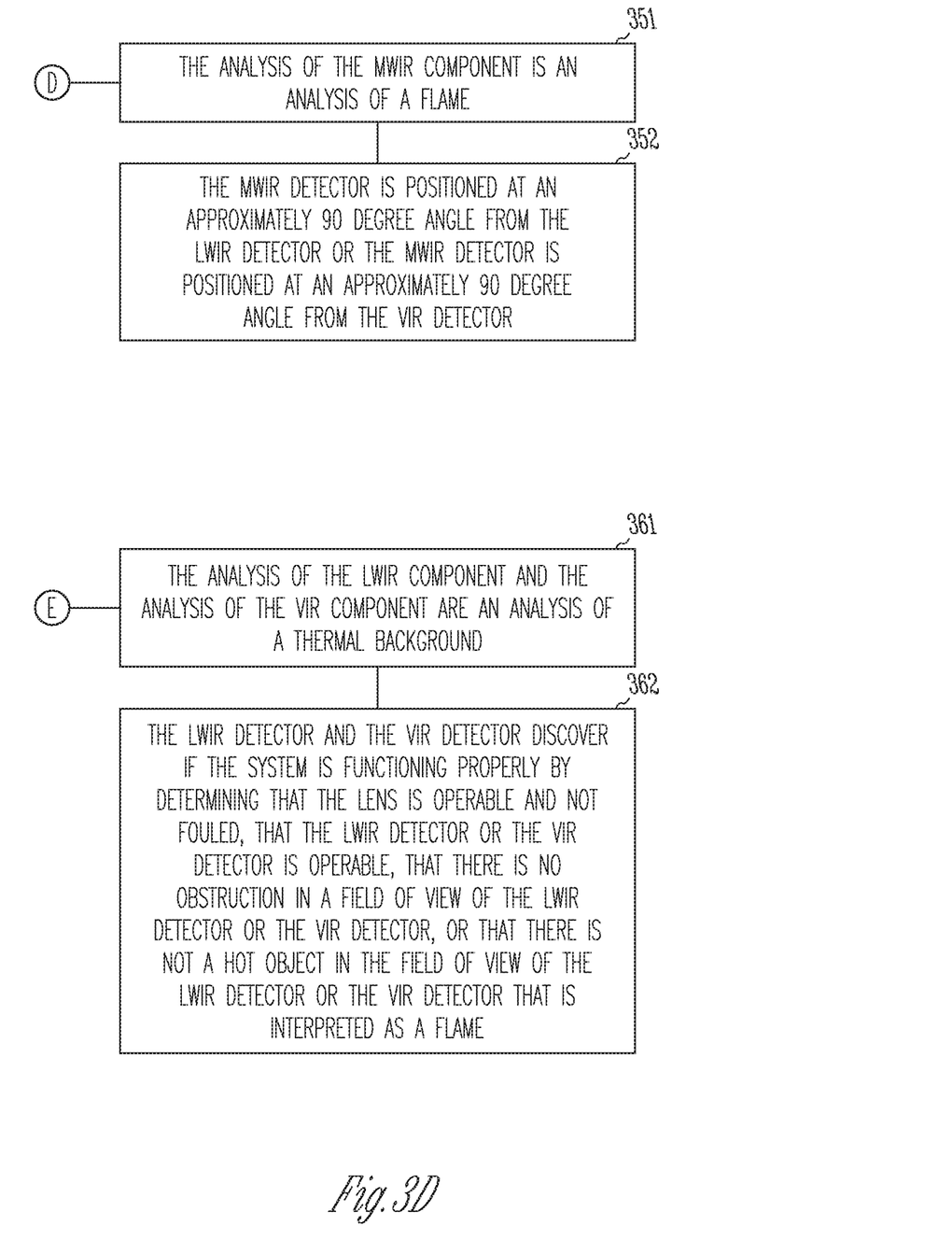

The modular approach of using two cameras is illustrated in FIGS. 1 and 2. As noted, a flame sensing camera can include a bolometer, with a window that only permits MWIR to reach the bolometer array. A filter blocks non flame bands such as those from the sun that may harm the array. A second camera is located at approximately 90 degrees from the first camera and receives light from a beam splitter. The second camera could be a standard LWIR camera or visible camera. Both an LWIR camera and a visible camera have advantages. As noted, an LWIR camera can record fail-safe operation 24 hours a day, but is more expensive than a CMOS visible camera, which can only record in the daylight or when external lighting provides imaging capability.

One advantage of having two cameras is that the cameras can be selected based on the field of view and array size to suit the needs of the application. There are a number of specific examples that can show the range of camera variations for the fail-safe camera assuming that the MWIR camera observed flames within the full FOV.

In an embodiment, a standard MWIR camera with an MWIR window can be used. The use of a standard MWIR camera makes the system less expensive and more flexible in that in connection with that standard MWIR camera, a range of lower cost, standard off the shelf LWIR and visible/near infrared (VIS/NIR) cameras can be used. For example, a VIS/NIR fail-safe camera could include a small pixel pitch that only observes a central part of an image or a small pixel pitch that observes a full field of view (FOV) image with an expanding lens. The beam splitter that is used with such VIS/NIR cameras could include a simple beam splitter made of a thin metal coating on an MWIR transparent material such as sapphire that transmits a significant portion of the incident light. Alternatively, a more complex beam splitter that recovers more of the light but involves more complex coatings could be used.

In an embodiment that uses an LWIR camera, the LWIR camera could include the same field of view (pitch and array size) as the particular MWIR camera that is being used. Alternatively, a smaller array size that is lower in cost could be used, which would observe a central FOV for fail safe operation and which has an expansion lens and observes the full FOV but at lower resolution. Alternatively, an LAIR camera could be used that provides a higher resolution, which in turn provides fail-safe operation and high resolution surveillance by having a smaller pixel pitch with more pixels in the same FOV and higher resolution by having a similar pitch but a larger array size with an intermediate lens to provide the same FOV. In conjunction with these LWIR cameras, an embodiment can employ a simple silicon beam splitter that transmits 60% and reflects 40% in both bands for lower cost and adequate performance. Alternatively, a more complex beam splitter with an optical coating that transmits close to 100% of the MWIR and reflects close to 100% of the LWIR radiation for optimal signals could be used.

Referring now specifically to FIG. 1, a flame detector system includes a lens 110 through which MWIR and LWIR pass. A beam splitter 120 splits the infrared radiation into an MWIR component 122 and an LWIR component 124. As noted in FIG. 1, in an embodiment, about 60% of the MWIR and about 40% of the LWIR pass through the beam splitter 120. In a further embodiment, a lens 125 can be positioned after the beam splitter 120. Such a lens 125 can be beneficial if the field of view of the LWIR detector and the arrays of the MWIR detector differ. An MWIR detector 130 receives the MWIR from the beam splitter 120. In an embodiment, the MWIR detector can be an MWIR camera with an $Al_2O_3$ window, and can further be a low resolution and low cost MWIR camera that detects coarse flames, or a higher resolution and higher cost MWIR camera that readily detects distant flames or nearby benign flares. A $CO_2$ notch filter 132 can be placed between the beam splitter 120 and the MWIR device 130. The $CO_2$ notch filter permits the brighter $CO_2$ emission band to pass to the MWIR detector 130 and prevents such radiation as the black body radiation from hot soot passing to the MWIR detector. An LWIR camera or other detector 140 receives the LWIR from the beam splitter 120. Unlike the single camera embodiment, the LWIR camera 140 has no filter to attenuate the LWIR. A filter is not needed because the LWIR camera no longer needs to accommodate the MWIR and LWIR bands (like in a single camera embodiment). In a single camera embodiment, since both MWIR and LWIR must be accommodated, a filter is needed so the combined sun intensity across the MWIR and LWIR bands doesn't harm the array. In an embodiment, a low resolution and low cost LWIR camera can determine if the lenses 110 and/or 125 are transmitting properly and/or if there are any obstructions in the field of view of the LWIR camera 140. If the lenses are not transmitting properly and/or there is an obstruction in the field of view, then there are one or more problems or events that are preventing the system from functioning properly. In an embodiment, a higher resolution and higher cost LWIR camera can be used so that surveillance is possible both during daylight and nighttime hours. A computer processor 150 is coupled to the MWIR camera 130 and the LWIR camera 140.

The flame detector system of FIG. 2 is similar to the flame detector system of FIG. 1. Specifically, the flame detector system of FIG. 2 includes the lens 110 through which MWIR passes. However, unlike the system of FIG. 1, the radiation of interest in FIG. 2 is visible/near infrared (VIS/NIR) radiation (LAIR is more than likely also present, but as noted the radiation of interest of the embodiment of FIG. 2 is VIS/NIR). The beam splitter 120 splits the infrared radiation into an MWIR component 222 and a VIS/NIR component 224. As noted in FIG. 2, in an embodiment, the beam splitter 120 passes about 60% of the MWIR (222) and passes about 50% of the VIS/NIR (224). In a further embodiment, a lens 225 can be positioned after the beam splitter 120. As noted, such a lens 225 can be beneficial if the field of view of the VIS/NIR detector 240 and the arrays of the MWIR detector 130 differ. The MWIR detector 130 receives the MWIR from the beam splitter 120. In an embodiment, the MWIR detector can be an MWIR camera with an $Al_2O_3$ window, and can further be a low resolution and low cost MWIR camera that detects coarse flames, or a higher resolution and higher cost MWIR camera that readily detects distant flames or nearby benign flares. A $CO_2$ notch filter 132 can be placed between the beam splitter 120 and the MWIR device 130. A VIS/NIR camera or other detector 240 receives the VIS/NIR radiation 224 from the beam splitter 120. Unlike the single camera embodiment, the VIS/NIR camera 240 has no filter to attenuate the VIS/NIR. In an embodiment, a low resolution and low cost visible CMOS camera can determine if the lenses 110 and/or 125 are transmitting properly and/or if there are any obstructions in the field of view of the VIS/NIR camera 240. In a general embodiment, the VIS/NIR detector 240 works best for daytime surveillance and/or illuminated nighttime surveillance. A computer processor 150 is coupled to the MWIR camera 130 and the VIS/NIR camera 240.

FIGS. 3A, 3B, 3C, and 3D are a block diagram illustrating features and operations of a method for implementing a configurable fail-safe flame detector. FIGS. 3A, 3B, 3C, and 3D include a number of process blocks 305-362. Though arranged somewhat serially in the example of FIGS. 3A, 3B, 3C, and 3D, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIGS. 3A, 311, 3C, and 3D, at 310, MWIR, LWIR, and VIS/NIR pass through a lens. At 320, the MWIR, the LWIR, and the VIS/NIR are split into an MWIR component, an LWIR component, and a VIS/NIR component. A beam splitter is used for this function, and as noted at 321, the beam splitter could be a silicon beam splitter, a silicon short pass beam splitter, or a chromium on aluminum oxide beam splitter. At 330, an MWIR detector receives and detects the MWIR component. At 340, an LWIR detector receives and detects the LWIR component and a VIS/NIR detector receives and detects the VIS/NIR component. At 350, the MWIR component is analyzed to determine the presence of a flame, and at 360, the LWIR component and the VIS/NIR component are analyzed to determine whether the system is functioning properly. As noted at 351, the analysis of the MWIR component is an analysis of a flame, and at 361, the analyses of the LWIR component and the VIS/NIR component are analyses of a thermal background. Block 362 indicates that the LWIR detector and the VIS/NIR detector discover if the system is functioning properly by determining that a lens is operable and not fouled, that the LWIR detector or the VIS/NIR detector is operable, that there is no obstruction in a field of view of the LWIR detector or the VIS/NIR detector, or that there is not a hot object in the field of view of the LWIR detector or the VIS/NIR detector that is interpreted as a flame.

At 331, the MWIR detector is a bolometer array that includes a filter-window and it is operable to permit only the MWIR component to reach the bolometer array. At 332, the MWIR detector is an MWIR camera. As further noted at 333, the MWIR detector includes a carbon dioxide filter. At 334, it is noted that the MWIR detector is an off the shelf product.

At 341, the LWIR detector is an LWIR camera. At 342, the VIS/NIR detector is a VIR camera, and at 342A, the VIR camera is a near infrared light camera. As noted at 343, the LWIR detector does not include a filter or other device for attenuating the LWIR component. And as noted at 344, in an embodiment, a lens is positioned between the beam splitter and one or more of the LWIR detector and the VIS/NIR detector. At 345, it is noted that the LWIR detector and the VIS/NIR detector are off the shelf components.

At 352, the MWIR detector is positioned at an approximately 90 degree angle from the LWIR detector and/or the MWIR detector is positioned at an approximately 90 degree angle from the VIS/NIR detector.

It is noted that the failsafe condition of the common optics in the systems of FIGS. 1 and 2 can be determined, and it also can be determined whether there is anything in the field of view. However, it cannot be ascertained if the MWIR detector is operating properly. That is, the LWIR detector functionality can be judged by its imaging of the radiation from the scene, but the MWIR detector mostly sees a black image. To address this, in an embodiment, an MWIR emitting element can be added to the system to determine the functionality of the MWIR detector. The MWIR emitting element could be, for example, an in-band LED, a heated element such as the lens in the system, the beam splitter, and/or an internal incandescent bulb. The MWIR emitting element would product enough MWIR radiation so that the MWIR detector would see an image of the element. An embodiment with such an MWIR emitting element would provide a more complete failsafe system.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
    a lens through which one or more of mid-wave infrared radiation (MWIR), long-wave infrared radiation (LWIR), and visible/near infrared radiation (VIS/NIR) pass;
    a beam splitter to split the MWIR, the LWIR, and the VIS/NIR into one or more of an MWIR component, an LWIR component, and a VIS/NIR component;
    an MWIR detector for receiving the MWIR component;
    one or more of an LWIR detector for receiving the LWIR component and a visible/near infrared (VIS/NIR) detector for receiving the VIS/NIR component, wherein the LWIR detector and the VIS/NIR detector are standalone units separate from the detector; and
    a computer processor coupled to the MWIR detector, the LWIR detector, and the VIS/NIR detector;
    wherein the MWIR detector is operable to detect the MWIR component;
    wherein the LWIR detector is operable to detect the LWIR component;
    wherein the VIS/NIR detector is operable to detect the VIS/NIR component;
    wherein the computer processor is operable to analyze the MAIM component and to determine a presence of a flame;
    wherein the computer processor is operable to analyze one or more of the LWIR component and the VIS/NIR component and to determine whether the system is functioning properly;
    wherein the MWIR detector comprises a standalone MWIR camera, the LWIR detector comprises a standalone LWIR camera, and the VIS/NIR detector comprises a standalone VIS/NIR camera; and
    wherein one or more of the MWIR detector, the LWIR detector, and the VIS/NIR detector are standard off the shelf products.

2. The system of claim 1, wherein the MWIR detector comprises a bolometer array and a filter-window operable to permit only the MAIM component to reach the bolometer array.

3. The system of claim 1, wherein the MWIR detector is positioned at an approximately 90 degree angle from the LWIR detector or the MWIR detector is positioned at an approximately 90 degree angle from the VIS/NIR detector.

4. The system of claim 1, wherein the analysis of the LWIR component and the analysis of the VIS/NIR component comprises an analysis of a thermal background.

5. The system of claim 1, wherein one or more of the LWIR detector and the VIS/NIR detector determine if the system is functioning properly by determining that the lens is operable, that the LWIR detector or the VIS/NIR detector is operable, that there is an obstruction in a field of view of the LWIR detector or the VIS/NIR detector, or that there is a presence of a hot object in the field of view of the LWIR detector or the VIS/NIR detector that is interpreted as a flame; and comprising an MWIR emitting element for determining the functionality of the MWIR detector.

6. The system of claim 1, wherein the LWIR detector does not include a filter or other device for attenuating the LWIR component.

7. The system of claim 1, wherein the MWIR detector comprises a carbon dioxide filter.

8. The system of claim 1, comprising a lens positioned between the beam splitter and one or more of the LWIR detector and the VIS/NIR detector.

9. The system of claim 1, wherein the beam splitter comprises one or more of a silicon beam splitter, a silicon short pass beam splitter, or a chromium on aluminum oxide beam splitter.

10. A system comprising:
a beam splitter to split mid-wave infrared radiation (MWIR) and long-wave infrared radiation (LWIR) into an MWIR component and an LWIR component;
an MWIR detector for receiving the MWIR component;
an LWIR detector for receiving the LWIR component, wherein the LWIR detector is a standalone unit separate from the MWIR detector; and
a computer processor coupled to the MWIR detector and the LWIR detector;
wherein the MWIR detector is operable to detect the MWIR component;
wherein the LWIR detector is operable to detect the LWIR component;
wherein the computer processor is operable to analyze the MWIR component and to determine a presence of a flame;
wherein the computer processor is operable to analyze the LWIR component to determine whether the system is functioning properly;
wherein the MWIR detector comprises a standalone MWIR camera, the LWIR detector comprises a standalone camera, and the VIS/NIR detector comprises a standalone VIS/NIR camera; and
wherein one or more of the MWIR detector, the LWIR detector, and the VIS/NIR detector are standard off the shelf products.

11. The system of claim 10, comprising a lens through which one or more of the MWIR component and the LWIR component pass.

12. The system of claim 11, wherein one or more of the LWIR detector and the VIS/NIR detector determine if the system is functioning properly by determining that the lens is operable, that the LWIR detector or the VIS/NIR detector is operable, that there is an obstruction in a field of view of the LWIR detector or the VIS/NIR detector, that there is a presence of a hot object in the field of view of the LWIR detector or the VIS/NIR detector that is interpreted as a flame.

13. The system of claim 10, wherein the beam splitter is operable to split visible/near infrared radiation (VIS/NIR) into a VIS/NIR component.

14. The system of claim 13, comprising a visible/near infrared (VIS/NIR) detector for receiving the VIS/NIR component.

15. The system of claim 14, wherein the computer processor is coupled to the VIS/NIR detector; wherein the VIS/NIR detector is operable to detect the VIS/NIR component; and wherein the computer processor is operable to analyze the VIS/NIR component and to determine whether the system is functioning properly.

16. The system of claim 14, wherein the MWIR detector is positioned at an approximately 90 degree angle from the LWIR detector or the MWIR detector is positioned at an approximately 90 degree angle from the VIS/NIR detector.

17. The system of claim 10, wherein the MWIR detector comprises a bolometer array and a filter-window operable to permit only the MWIR component to reach the bolometer array; and wherein the MWIR detector, the LWIR detector, or the VIS/NIR detector are commercial off the shelf products.

* * * * *